J. A. FRAUENHEIM.
BOLT.
APPLICATION FILED MAY 12, 1915.

1,271,151.

Patented July 2, 1918.
2 SHEETS—SHEET 1.

WITNESSES
R A Balderson

INVENTOR
J. A. Frauenheim
by Bakewell, Byrnes & Parmelee
Attys

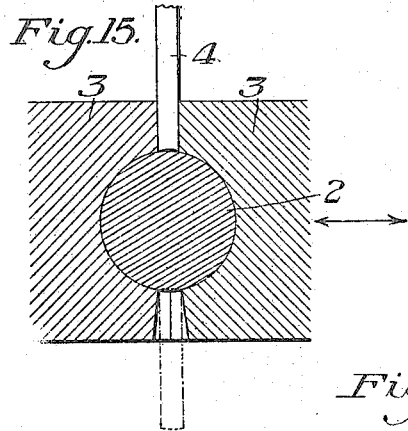
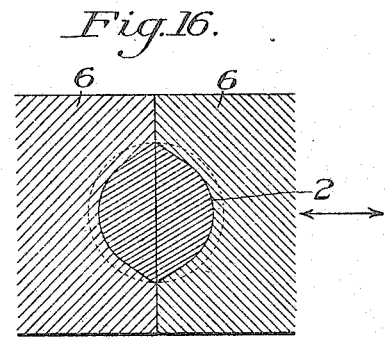
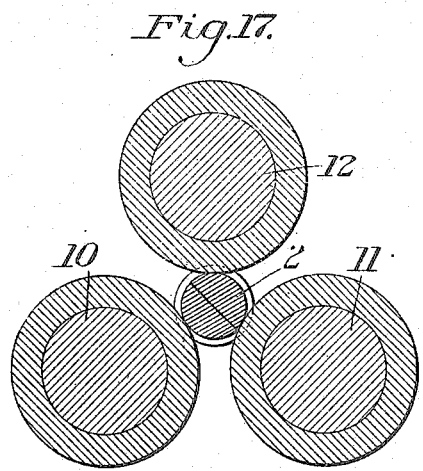
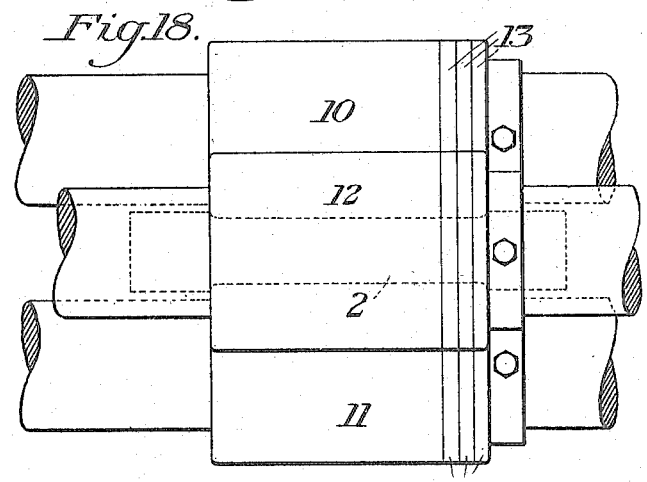

UNITED STATES PATENT OFFICE.

JOSEPH A. FRAUENHEIM, OF ZELIENOPLE, PENNSYLVANIA, ASSIGNOR TO KERNER MANUFACTURING COMPANY, OF PITTSBURGH, PENNSYLVANIA, A CORPORATION OF PENNSYLVANIA.

BOLT.

1,271,151. Specification of Letters Patent. Patented July 2, 1918.

Original application filed April 7, 1914, Serial No. 830,140. Divided and this application filed May 12, 1915. Serial No. 27,599.

*To all whom it may concern:*

Be it known that I, JOSEPH A. FRAUENHEIM, a citizen of the United States, residing at Zelienople, in the county of Butler and State of Pennsylvania, have invented a new and useful Improvement in Bolts, of which the following is a full, clear, and exact description, reference being had to the accompanying drawings, forming part of this specification, in which—

Fig. 15 is a sectional view through one form of die for carrying out the first step of my improved method;

Fig. 16 is a similar view through a die for compressing a central or body portion of the bolt for carrying out the second step of my method;

Fig. 17 is a sectional view through a set of rolls which may also be used for carrying out the second step of my method; and Fig. 18 is a plan view of the rolls shown in Fig. 17.

This invention relates to an improvement in bolts, and particularly stay bolts for steam boilers.

The object of my invention is to provide a bolt having a body portion comprising a plurality of members which extend from head to head at the ends thereon, and in which the body portion is of reduced diameter and is provided with the outer scale and at the same time in which the heads are formed from a solid piece of metal.

In manufacturing these bolts by one of my methods, I take a blank of approximately the diameter or slightly greater than the diameter of the head and then punch out a portion of the center of the blank, after which I reduce the body portion between the heads, and then finish the bolts in the ordinary manner.

I am aware that it is old to form bolts of a plurality of members, upset and weld the head portions to form heads of a greater diameter than the body portion, then twist the body and thread the heads. By this method, it is necessary to heat the blank several times between the different operations and at the same time, care must be taken so as not to weld the two members together beyond the heads, and at the same time, weld the members to each other at the heads.

I am also aware that it is old to form bolts from a single member which has been slotted by means of a saw, threaded, and then the portions between the threads turned off to reduce the body of the bolt to a diameter less than that of the bottom of the threads. In structures of this character, the scale formed by working the material while hot is removed, which greatly reduces the strength of the bolt and at the same time provides a surface which is more readily attacked by the acids and foreign matter contained in the feed water for the boilers.

The precise nature of my invention will be best understood by reference to the accompanying drawings, which will now be described, it being premised, however, that various devices may be used to carry out my invention, without departing from the spirit and scope of my invention, as defined in appended claims.

Figure 1:
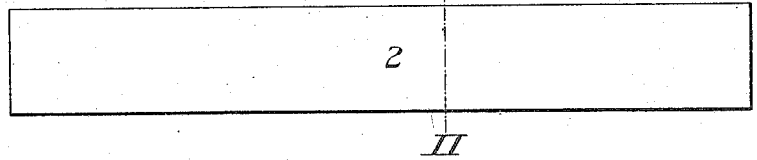
Figure 1 is a side elevation of one form of blank for making bolts by one method of my improved invention.
Figure 2:
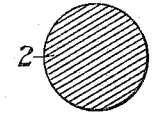
Fig. 2 is a section on the line II—II of Fig. 1.
Figure 3:
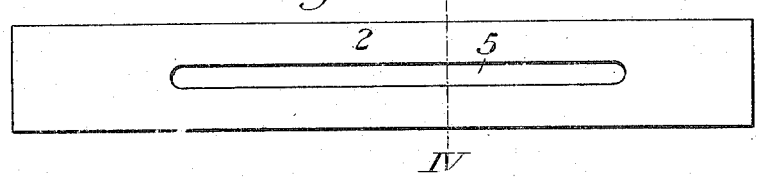
Fig. 3 is a view similar to Fig. 1, showing the blank after it has passed through the first step of my method.
Figure 4:
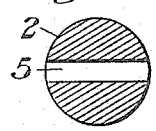
Fig. 4 is a section on the line IV—IV of Fig. 3.
Figure 5:
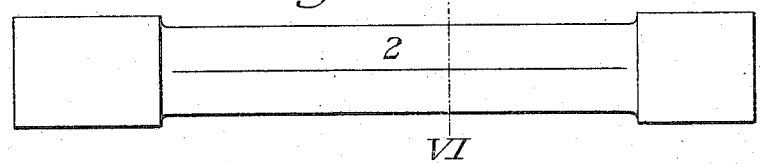
Fig. 5 is a side elevation of a blank after it has passed through a portion of the second step.
Figure 6:
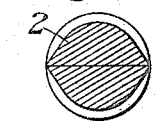
Fig. 6 is a sectional view on the line VI—VI of Fig. 5.
Figure 7:
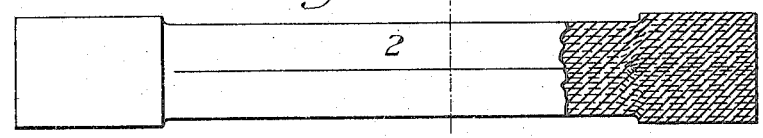
Fig. 7 is a side elevation partially in section of a blank after it has passed through the second step.
Figure 8:
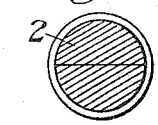
Fig. 8 is a section on the line VIII—VIII of Fig. 7.
Figure 9:
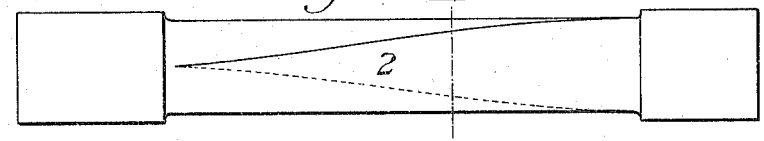
Fig. 9 is a view of the blank after it has been twisted.
Figure 10:
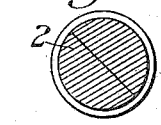
Fig. 10 is a section on the line X—X of Fig. 9.
Figure 11:
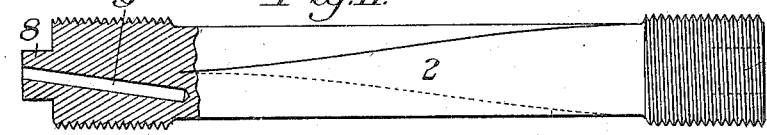
Fig. 11 is a side elevation partially in section of a finished bolt.
Figure 12:
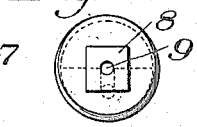
Fig. 12 is an end view thereof.

Referring to the accompanying drawings, the reference character 2 designates a blank which may be first heated and then placed between a pair of members 3, 3 forming one portion of a punching die; and 4 is a die which is arranged to be moved downwardly and punch out the portion designated in dotted lines in Fig. 15 of the blank 2. This first step will form a blank, such as shown in Figs. 3 and 4, in which the blank 2 is provided with a longitudinally extending opening 5 through the blank. The blank is then placed between a pair of dies 6, 6, as shown in Fig. 16, one of which is movable relatively to the other, to close the opening 5 of the blank, as shown therein. The blank, after it has passed through the second step, is shown in Figs. 5 and 6. The dies are then opened and the blank rotated and the dies again closed, which process of opening and closing the dies and rotating the blank is repeated a number of times in order to reduce the central or body portion of the blank 2, to form a structure, such as shown in Figs. 7 and 8. The blank is then twisted at least ninety degrees, as shown in Figs. 9 and 10, after which the heads are milled off and threaded, as shown in Figs. 11 and 12. The ends of the bolt may be provided with a socket, such as shown at 7, for receiving a wrench, or may be squared, as shown at 8. 9 designates a tell-tale hole which is drilled from the center of one of the heads at an angle to the axis of the bolt, so that the inner end of the tell-tale hole will be opposite the solid metal of one of the body members extending from head to head.

If desired, the step of reducing the body portion and closing the slot can be accomplished by a set of rolls 10, 11, and 12, as indicated in Figs. 17 and 18. The roll 12 is arranged to be moved in a vertical direction with relation to the rolls 10 and 11, so as to permit the blank to be inserted between the rolls. The roll 12 is then moved toward the rolls 10 and 11 the proper distance to produce a blank having a body and head portions of the proper diameters.

If desired, these rolls may be provided with a plurality of removable collars, such as indicated at 13, so that bolts of varying length can be operated upon by the same set of rolls.

Figure 13:
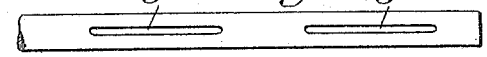
Fig. 13 is a side elevation of another form of blank after it has passed through the first step of the method.
Figure 14:
Fig. 14 is a similar view of the same blank after it has passed through the second step and has been threaded.

In Figs. 13 and 14, I have shown blanks which have been operated upon by what might be termed a "continuous" process.

When carrying out my invention by this process, I heat a long bar, such as is shown in Fig. 13, to the proper temperature, punch out a portion, such as indicated at 5ª, then move the blank forward a predetermined distance and punch out a second portion, such as indicated at 5ᵇ. The body portions of the various bolts in the continuous blank are then operated upon in any desired manner, in order to close the slots and reduce said body portions, after which the bolts may be twisted and then cut apart and threaded, or they may be first threaded, as shown in Fig. 13, and afterward cut apart.

It will also be understood by those familiar with the art that after the blanks have been twisted, as shown in Fig. 9, they may be inserted in a die, such as shown in Fig. 16, to again straighten them, or may be rolled between rolls, such as shown in Figs. 17 and 18, or if desired, the blank such as shown in Fig. 3 may be twisted before the body portion is reduced.

The advantages of my invention result from the provision of a bolt having a reduced body portion which is provided with the initial scale and in which the longitudinal fibers of the original iron have not been distorted to any appreciable extent, so that the quality of the iron has not been deteriorated and in which there are a greater number of longitudinal fibers in the heads than in the body portion.

This application is a division of my application Serial No. 830,140, filed April 7, 1914.

I claim:

1. A stay bolt having a head at each end and a body portion between the heads, said body portion comprising a plurality of members, there being a greater number of longitudinal fibers in the heads than in the body portion, some of the fibers extending from end to end of the bolt through the heads and body portion, the other fibers merely extending from the ends of the heads to the junctions of the heads and body; substantially as described.

2. A stay bolt having a head at each end and a body portion between the heads, said body portion comprising a plurality of members, there being a greater number of longitudinally extending fibers in the heads than in the body portion, some of the fibers merely extending from the ends of the heads to the junctions of the heads and body, the other fibers extending from end to end of the bolt through the heads and body portions, said last mentioned fibers flaring outwardly at the junction of the heads and body about the fibers which merely extend from the ends of the heads to the junctions of the heads and body portion; substantially as described.

In testimony whereof, I have hereunto set my hand.

JOSEPH A. FRAUENHEIM.

Witnesses:
JESSE B. HELLER,
GEO. B. BLEMING.